US012668242B2

(12) United States Patent　　　　(10) Patent No.:　US 12,668,242 B2
Moyal et al.　　　　　　　　　　　(45) Date of Patent:　Jun. 30, 2026

(54) ENERGY RELEASE BASED SPACING FOR VEHICLES

(71) Applicant: International Business Machines Corporation, Armonk, NY (US)

(72) Inventors: Shailendra Moyal, Pune (IN); Partho Ghosh, Kolkata (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 18/047,442

(22) Filed: Oct. 18, 2022

(65) Prior Publication Data

US 2024/0123988 A1　　Apr. 18, 2024

(51) Int. Cl.
　　*B60W 30/16*　　　　(2020.01)
　　*B60W 50/14*　　　　(2020.01)
　　*G05D 1/695*　　　　(2024.01)

(52) U.S. Cl.
　　CPC ............ *B60W 30/16* (2013.01); *B60W 50/14* (2013.01); *B60W 2050/146* (2013.01); *B60W 2520/10* (2013.01); *B60W 2530/10* (2013.01); *B60W 2754/30* (2020.02); *G05D 1/695* (2024.01)

(58) Field of Classification Search
　　CPC .............. B60W 30/16; B60W 30/143; B60W 30/18163; B60W 50/14; B60W 2050/146
　　USPC ......................................................... 701/96
　　See application file for complete search history.

(56) References Cited

U.S. PATENT DOCUMENTS

| | | | | |
|---|---|---|---|---|
| 11,975,723 | B2 * | 5/2024 | Sakagami | ........... B60W 40/068 |
| 12,271,851 | B2 * | 4/2025 | Lu | ....................... G06Q 10/0635 |
| 2019/0259503 | A1 * | 8/2019 | Rosenstrom | ........... G21B 3/002 |
| 2021/0253097 | A1 * | 8/2021 | Lacaze | ................ B60W 40/105 |
| 2022/0309377 | A1 * | 9/2022 | Yu | ............................ G06F 30/20 |
| 2022/0375339 | A1 * | 11/2022 | Luo | .......................... G06F 17/18 |
| 2023/0234596 | A1 * | 7/2023 | Woo | .................. B60W 50/0097 |
| | | | | 701/41 |

(Continued)

FOREIGN PATENT DOCUMENTS

| | | | | |
|---|---|---|---|---|
| CN | 108648447 | B | 4/2019 | |
| CN | 108290579 | B * | 4/2022 | ............. G06F 18/24 |
| CN | 117416346 | A * | 1/2024 | ........ B60W 30/0953 |

OTHER PUBLICATIONS

Karapetkov, Stanimir, et al. "Identifying vehicle and collision impact by applying the principle of conservation of mechanical energy." Transport and Telecommunication 20.3 (2019): 191-204. (Year: 2019).*

(Continued)

*Primary Examiner* — Erin D Bishop
*Assistant Examiner* — Keith A von Volkenburg
(74) *Attorney, Agent, or Firm* — Yee & Associates, P.C.

(57) ABSTRACT

A computer implemented method for spacing vehicles. A computer system simulates the vehicles moving on a road using a simulation system. The computer system determines an energy of the vehicles moving on the road using the simulation system. The computer system determines a desired spacing for the vehicles needed to reduce an undesired vehicle contact in response to an unexpected change in driving parameters for a number of the vehicles based on the energy of the vehicles moving on the road using the simulation system. The computer system performs a set of actions for the vehicles using the desired spacing determined for the vehicles.

16 Claims, 11 Drawing Sheets

(56)          References Cited

U.S. PATENT DOCUMENTS

| | | | |
|---|---|---|---|
| 2023/0415746 A1* | 12/2023 | Ghandriz | .............. B60W 50/06 |
| 2024/0017747 A1* | 1/2024 | Hasenklever | ......... G01S 17/931 |
| 2024/0310851 A1* | 9/2024 | Ebrahimi Afrouzi | ... G01S 17/87 |

OTHER PUBLICATIONS

Carrone, Andrea Papu et al. "Autonomous Vehicles in Mixed Motorway Traffic: Capacity Utilisation, Impact and Policy Implications." Transportation (Dordrecht) 48.6 (2021): 2907-2938. Web. (Year: 2021).*

Hu, Manjiang et al. "Coordinated Collision Avoidance for Connected Vehicles Using Relative Kinetic Energy Density." International journal of automotive technology 18.5 (2017): 923-932. Web. (Year: 2017).*

Benekohal et al., "CARSIM: Car-Following Model for simulation of Traffic inNormal and top-and-Go Conditions," Transportation Research Record 1194, Jan. 1988, pp. 99-111.

Fernandes et al., "Multiplatooning Leaders Positioning and Cooperative Behavior Algorithms of Communicant Automated Vehicles for High Traffic Capacity," IEEE Transactions on Intelligent Transportation Systems, Jun. 2015, vol. 16, No. 3, pp. 1172-1187.

Gashaw et al., "Modeling and analysis of mixed flow of cars and powered two wheelers," Transportation Research Part C: Emerging Technologies, Apr. 2018, vol. 89, pp. 148-167.

Khorasani-Zavareh et al., "Kinetic energy management in road traffic injury prevention: a call for action," Journal of Injury and Violence Research, Published Nov. 11, 2013, vol. 7, No. 1, pp. 36-37.

"Schwab et al., ""Spatio-Semantic Road Space Modeling forVehicle-Pedestrian Simulation to Test Automated Driving Systems,"" MDPI: Sustainability 2020, May 7, 2020, 25 pages."

* cited by examiner

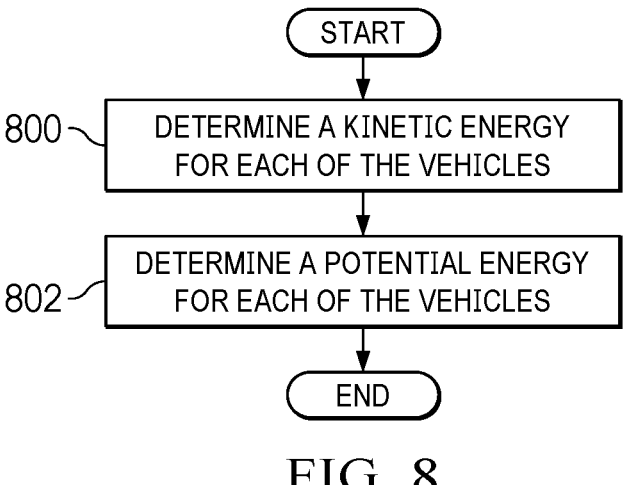

START

800 — DETERMINE A KINETIC ENERGY
FOR EACH OF THE VEHICLES

802 — DETERMINE A POTENTIAL ENERGY
FOR EACH OF THE VEHICLES

END

FIG. 8

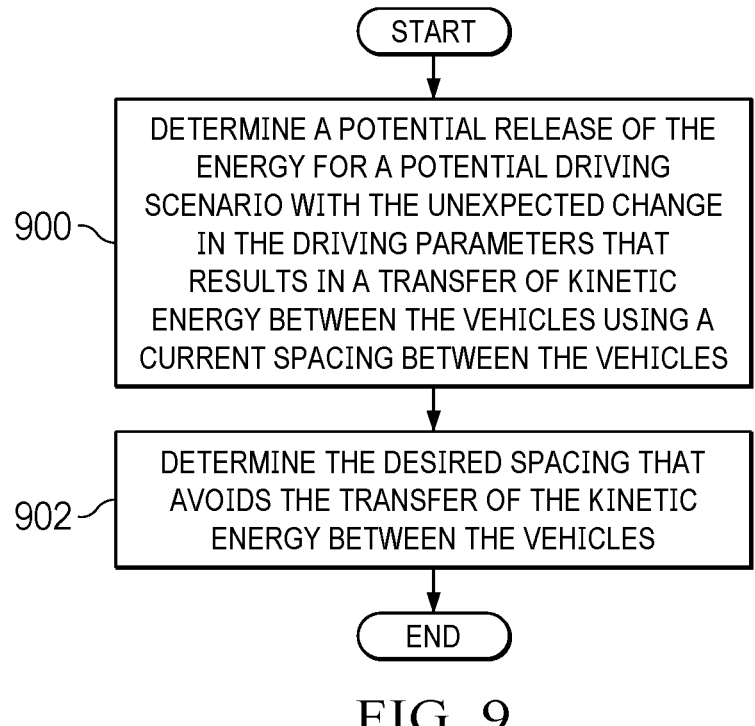

START

900 — DETERMINE A POTENTIAL RELEASE OF THE
ENERGY FOR A POTENTIAL DRIVING
SCENARIO WITH THE UNEXPECTED CHANGE
IN THE DRIVING PARAMETERS THAT
RESULTS IN A TRANSFER OF KINETIC
ENERGY BETWEEN THE VEHICLES USING A
CURRENT SPACING BETWEEN THE VEHICLES

902 — DETERMINE THE DESIRED SPACING THAT
AVOIDS THE TRANSFER OF THE KINETIC
ENERGY BETWEEN THE VEHICLES

END

FIG. 9

ENERGY RELEASE BASED SPACING FOR VEHICLES

BACKGROUND

1. Field

The disclosure relates generally to a computer system for managing vehicles and more specifically to a computer implemented method, apparatus, system, and computer program product for managing vehicle spacing based on energy stored in vehicles.

2. Description of the Related Art

While vehicles are moving on the road, the vehicles need to maintain proper spacing between the vehicles for safety reasons. If the driver of a car follows another vehicle too closely, the driver may be unable to avoid an impact with the lead vehicle if the lead vehicle stops or slows suddenly.

With unexpected stops or slowdowns by a first vehicle, the driver of a second vehicle behind the first vehicle may be forced to make a sudden stop to avoid a collision. However, with a sudden stop, another vehicle behind the second vehicle may hit the back of the vehicle. Proper spacing may also allow a driver to react a problem without a need for a sudden stop and reduce the possibility of being rear ended.

Accidents involving one vehicle rear ending another vehicle is the most common type of accident and can also be one of the most dangerous types of accidents. For example, a study by the National Highway safety Administration (NHTSA) found that 30% of all traffic accidents that results in a serious injury are caused by rear end collisions.

With respect to spacing, a common rule of thumb is a three second rule. With the three second rule, when the first vehicle ahead of the second vehicle passes any given point, three seconds should pass before the second vehicle crosses the same point. This rule requires the driver to find landmark points along the road and determine an elapsed time to pass the landmark after the vehicle passes the landmark. This rule is a general rule for ideal driving conditions between vehicles. With non-ideal driving conditions, the spacing between vehicles is increased.

SUMMARY

According to one illustrative embodiment, a computer implemented method spaces vehicles. A computer system simulates the vehicles moving on a road using a simulation system. The computer system determines an energy of the vehicles moving on the road using the simulation system. The computer system determines a desired spacing for the vehicles needed to reduce an undesired vehicle contact in response to an unexpected change in driving parameters for a number of the vehicles based on the energy of the vehicles moving on the road using the simulation system. The computer system performs a set of actions for the vehicles using the desired spacing determined for the vehicles. According to other illustrative embodiments, a computer system and a computer program product for spacing vehicles are provided.

BRIEF DESCRIPTION OF THE DRAWINGS

FIG. 8 is a flowchart of a process for determining the energy of vehicles in accordance with an illustrative embodiment;

FIG. 9 is a flowchart of a process for determining a desired between vehicles in accordance with an illustrative embodiment;

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
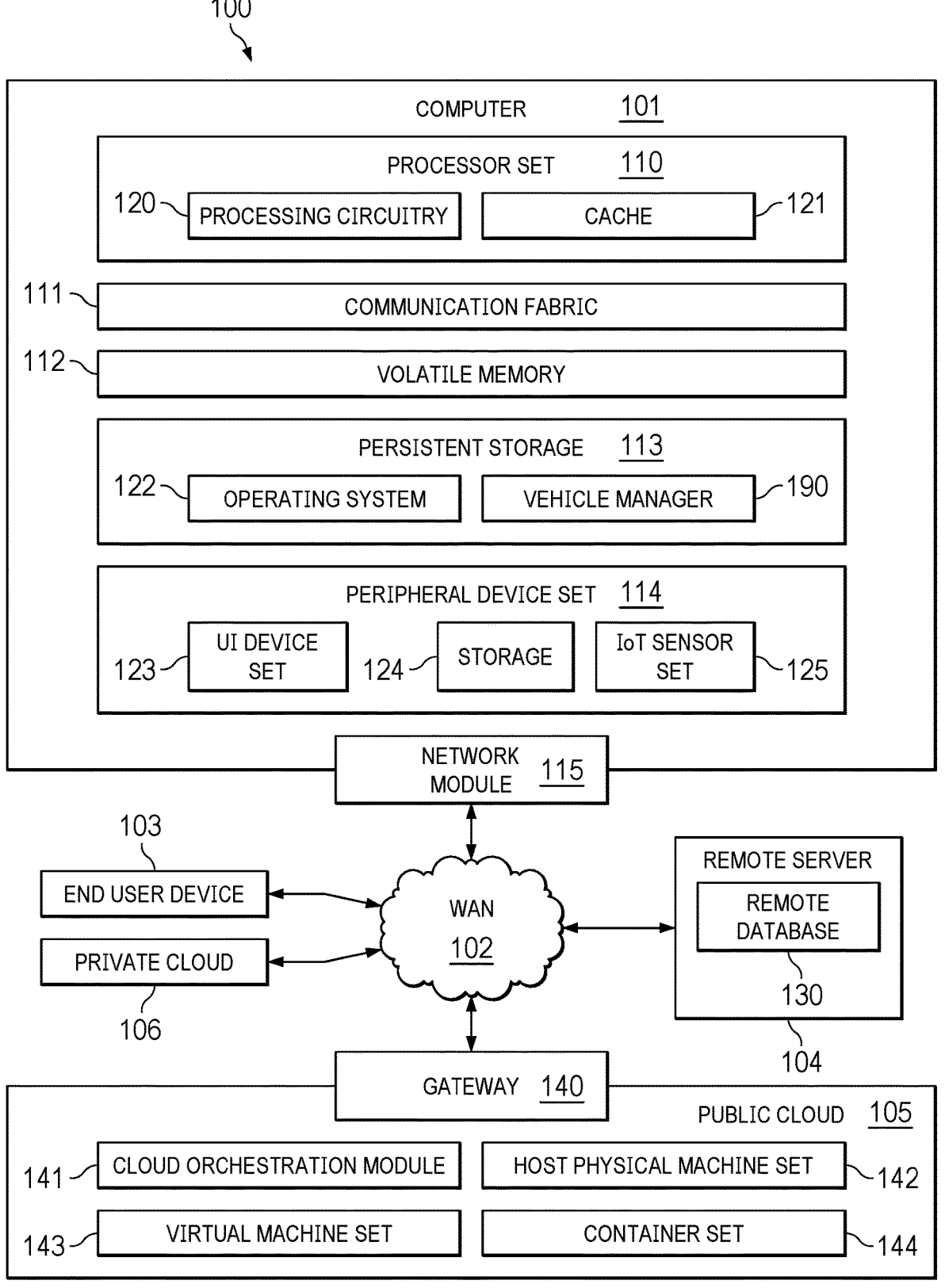
FIG. 1 is a block diagram of a computing environment in which illustrative embodiments can be implemented.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as vehicle manager 190. In addition to vehicle manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and vehicle manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in vehicle manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in vehicle manager 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. For example, the illustrative embodiments recognize and take into account current guidance such as the three second rule is a general rule and does not take into account different types of vehicles that may be on the road. The appropriate spacing between vehicles can change for different situations and different types of vehicles. Different types of vehicles can have different dimensions and weight. As a result, the inertia between vehicles of different sizes can require different spacing. As another example, different types of vehicles can also have different types of braking performance. The braking performance is how quickly a vehicle can reduce the using the braking system. This braking performance can also affect the spacing between vehicles.

For example, a driver of a recreational vehicle (RV) may require more than three seconds while a driver of a sports car made require less than three seconds to reduce speed or stop in response unexpected slowdowns or stops by vehicles on the road. The appropriate spacing between vehicles can change for different situations and different types of vehicles. As another example, wet roads at night can require more spacing as compared to excellent road conditions during the day.

As used herein, "a number of" when used with reference to items, means one or more items. For example, "a number of different considerations" is one or more different considerations.

The illustrative embodiments recognize and take into account that determinations of spacing between vehicles can be made more accurately using the energy in the vehicles moving on the road. A digital twin simulation can be performed for vehicles moving on the road. The spacing can be made to reduce or avoid undesired contact between vehicles in the event that unanticipated events occur causing sudden braking or stopping of the vehicles. Further, the digital twin simulation can also be used to obtain vehicle density that results in a desired traffic flow.

The illustrative embodiments provide a computer implemented method, computer system, and computer program product for spacing vehicles. A computer system simulates the vehicles moving on a road using a simulation system. The computer system determines an energy of the vehicles moving on the road using the simulation system. The computer system determines a desired spacing for the vehicles needed to reduce an undesired vehicle contact in response to an unexpected change in driving parameters for a number of the vehicles based on the energy of the vehicles moving on the road using the simulation system. The computer system performs a set of actions for the vehicles using the desired spacing determined for the vehicles.

As used herein, a "set of" when used with reference items means one or more items. For example, a set of actions is one or more actions.

For example, a digital twin computing system can be used to identify kinetic energy and potential energy stored within each vehicle while the vehicles are moving on a road. The digital twin system can run simulations for the vehicles for different various potential driving scenarios for the vehicles to identify if any sudden change in driving parameters is required (like sudden braking, etc.) and if a potential driving scenario may result in an accident. Based on the results of running the simulation using potential driving scenarios, desired spacing between the vehicles that reduces or avoids an accident can be determined. This spacing can then be implemented by sending instructions to the vehicles to cause the vehicles to travel using the desired spacing.

Figure 2:
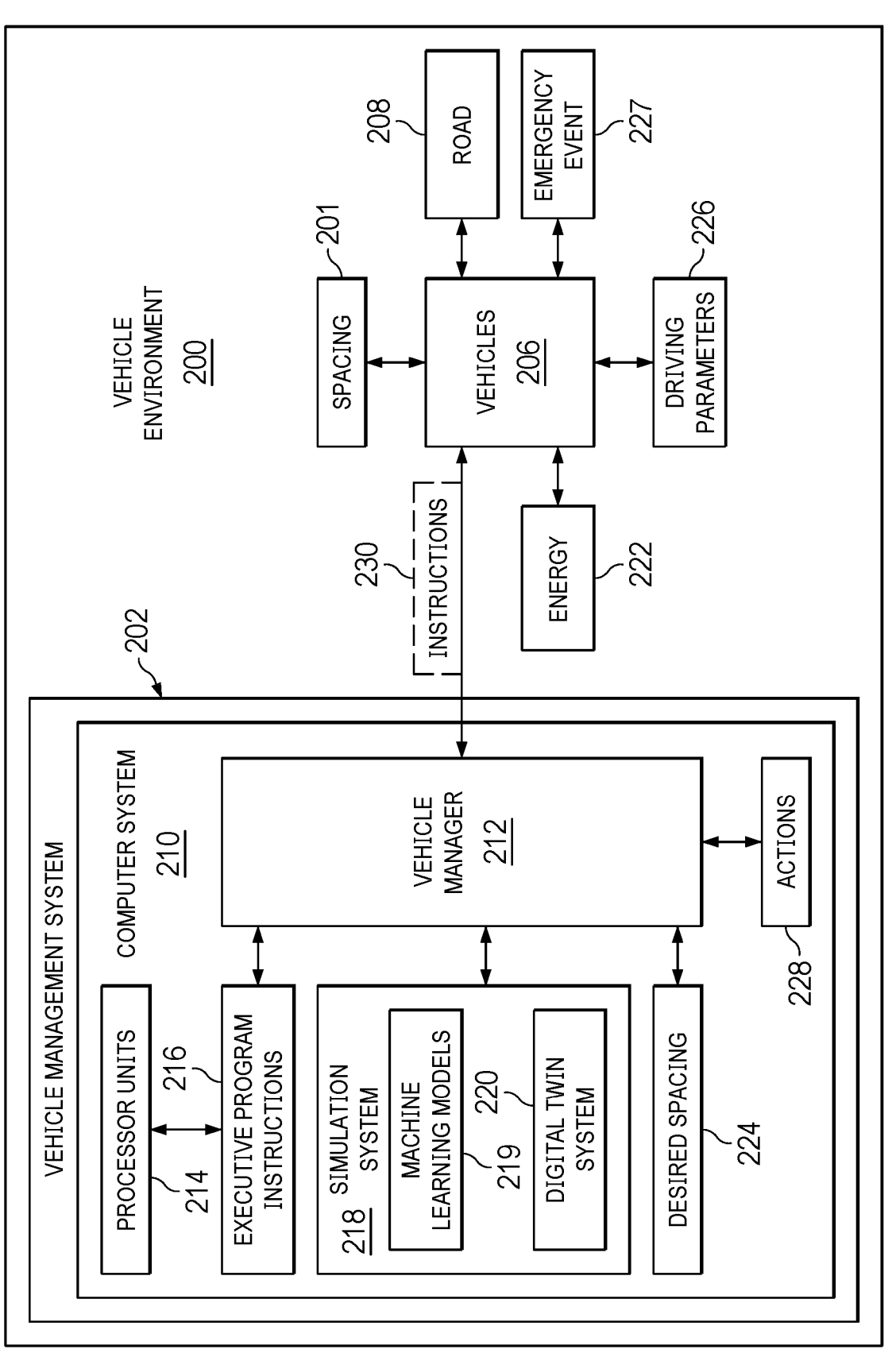
FIG. 2 is a block diagram of a vehicle environment in accordance with an illustrative embodiment.

With reference now to FIG. 2, a block diagram of a vehicle environment is depicted in accordance with an illustrative embodiment. In this illustrative example, vehicle environment 200 includes components that can be implemented in hardware such as the hardware shown computing environment 100 in FIG. 1.

As depicted, vehicle management system 202 in vehicle environment 200 can operate to manage spacing 201 between vehicles 206 moving on road 208. Vehicle management system 202 comprises computer system 210 and vehicle manager 212. In this illustrative example, vehicles 206 can take a number of different forms. For example, vehicles 206 can be selected from at least one of an automobile, a car, a sport utility vehicle (SUV), a truck, a pickup truck, a cargo truck, a semi-trailer truck, a dump truck, a cement truck, a sports car, a motorcycle, or some other type of vehicle.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the illustrative example, these different types of vehicles can be autonomous vehicles. An autonomous vehicle can sense the environment and move safely with little or no human input. This type of vehicle can also be referred to as a self-driving car. These types of vehicles can include sensors to obtain information about the environment around the vehicle. The sensors can include, for example, visible light cameras, thermographic cameras, radar, lidar, sonar, global positioning system (GPS) receivers, accelerometers, odometry, inertial measurement units, and other types of sensors. Control systems within the vehicle can interpret the sensor data to identify appropriate navigation paths, identify artifacts, interpret signage, and control movement of the vehicle.

Vehicle manager 212 is an example of an implementation for vehicle manager 190 shown in FIG. 1. As depicted, vehicle manager 212 is located in computer system 210. Vehicle manager 212 can be implemented in software, hardware, firmware or a combination thereof.

When software is used, the operations performed by vehicle manager 212 can be implemented in program instructions configured to run on hardware, such as a processor unit. When firmware is used, the operations performed by vehicle manager 212 can be implemented in program instructions and data and stored in persistent memory to run on a processor unit. When hardware is employed, the hardware can include circuits that operate to perform the operations in vehicle manager 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. When more than one data processing system is present in computer system 210, those data processing systems are in communication with each other using a communications medium. The communications medium can be a network. The data processing systems can be selected from at least one of a computer, a server computer, a tablet computer, or some other suitable data processing system.

As depicted, computer system 210 includes a number of processor units 214 that are capable of executing program instructions 216 implementing processes in the illustrative examples. As used herein, a processor unit in the number of processor units 214 is a hardware device and is comprised of hardware circuits such as those on an integrated circuit that respond and process instructions and program instructions that operate a computer. When the number of processor units 214 execute program instructions 216 for a process, the number of processor units 214 is one or more processor units that can be on the same computer or on different computers. In other words, the process can be distributed between processor units on the same or different computers in computer system 210. Further, the number of processor units 214 can be of the same type or different type of processor units. For example, the number of processor units 214 can be selected from at least one of a single core processor, a dual-core processor, a multi-processor core, a general-purpose central processing unit (CPU), a graphics processing unit (GPU), a digital signal processor (DSP), or some other type of processor unit.

In one illustrative example, vehicle manager 212 manages spacing of vehicles 206 using simulation system 218. In this example, simulation system 218 takes the form of digital twin system 220. Simulation system 218 can be implemented using one or more of machine learning models 219.

A machine learning model is a type of artificial intelligence model that can learn without being explicitly programmed. A machine learning model can learn based training data input into the machine learning model. The machine learning model can learn using various types of machine learning algorithms. The machine learning algorithms include at least one of a supervised learning, and unsupervised learning, a feature learning, a sparse dictionary learning, an anomaly detection, a reinforcement learning, a recommendation learning, or other types of learning algorithms.

Examples of machine learning models include an artificial neural network, a convolutional neural network, a decision tree, a support vector machine, a regression machine learning model, a classification machine learning model, a random forest learning model, a Bayesian network, a genetic algorithm, and other types of models. These machine learning models can be trained using data and process additional data to provide a desired output.

In this illustrative example, machine learning models 219 used in simulation system 218 can be comprised of the same types or different types of machine learning models. For example, a machine learning model in machine learning models 219 can be a classification machine learning model. As another example, a machine learning model in machine learning models 219 can be a convolutional neural network. These machine learning models can use sensor data as an input. Sensor data can also include video from cameras on or around vehicles 206, position data, distance information, and other data.

In this example, vehicle manager 212 simulates vehicles 206 moving on road 208 using simulation system 218. Vehicle manager 212 determines energy 222 of vehicles 206 moving on road 208 using simulation system 218. In this illustrative example, vehicles 206 can be a subset of the vehicles moving on road 208.

Vehicle manager 212 determines desired spacing 224 for vehicles 206 needed to reduce undesired vehicle contact in response to an unexpected change in driving parameters 226 for a number of the vehicles 206 based on energy 222 of vehicles 206 moving on road 208 using simulation system 218.

In this illustrative example, the determination of desired spacing 224 made by vehicle manager 212 can be between different vehicles in vehicles 206. In this illustrative example, the desired spacing is a spacing from a first vehicle to a second vehicle without an intervening vehicle between the first vehicle and the second vehicle. In this example, the number of vehicles 206 having an unexpected change in driving parameters 226 can be some or all of vehicles 206.

In this illustrative example, driving parameters 226 are parameters relating to the operation of vehicles 206. Driving parameters 226 can change unexpectedly in response to emergency event 227 involving one or more of vehicles 206. Emergency event 227 can result from unforeseen circumstances. Emergency event 227 can call for immediate action to avoid a transfer of energy 222 between vehicles 206.

In this illustrative example, emergency event 227 can include, for example, sudden braking, sudden acceleration, swerving, a tire blowout, and other events. Driving parameters 226 can include at least one of a speed, a location, a direction of travel, an acceleration, a deceleration, a brake pressure, a tire pressure, or other suitable parameters that can be monitored for unexpected changes to identify emergency events.

These emergency events and other unexpected events can result in unexpected changes in driving parameters 226. In other words, driving parameters 226 can have normal or predictable changes during normal operation of vehicles 206 on road 208.

Vehicle manager 212 performs a set of actions 228 for vehicles 206 using desired spacing 224 determined for vehicles 206. In this illustrative example, set of actions 228 can comprise repositioning a group of vehicles 206 to obtain desired spacing 224 between vehicles 206. In the depicted example, the repositioning can be at least one of adjusting a speed of the group of vehicles 206 to obtain desired spacing 224 between the vehicles, changing a lane for the group of the vehicles to obtain the desired spacing between the vehicles, displaying an instruction for a speed change in a group of the vehicles, wherein the speed change results in the desired spacing for the vehicles, or other suitable actions to obtain desired spacing 224 for vehicles 206.

As used herein, a "group of" when used with reference items means one or more items. For example, a group of vehicles 206 is one or more of vehicles 206.

In the illustrative example, vehicle manager 212 can perform a set of actions 228 by sending a number of instructions 230 to the group of vehicles 206. Instructions 230 can be commands to vehicles 206 to perform actions 228. Instructions 230 can depend on the level of autonomous functionality of a vehicle in vehicles 206.

For example, a vehicle in vehicles 206 can be categorized with different levels of autonomy such as the levels of automation defined by Society of Automotive Engineers (SAE) international. These levels include level 0: no automation, level 1: driver assistance, level 2: partial automation, level 3: conditional automation, level 4: high client automation, and level 5: full automation. In this illustrative example, vehicles 206 with automation levels 1-5 can receive and process instructions 232 change spacing 201 to desired spacing 224.

Instructions 230 can be computer readable instructions such as program code, commands, parameters, and other information needed to perform actions 228. When a vehicle is partially autonomous, the vehicle may include an ability to automatically follow another vehicle at a set distance using adaptive cruise control. With this example, instructions 230 can include a command to change the distance and a parameter for use by the adaptive cruise control to set spacing 201 for that vehicle. In another illustrative example, when the vehicle as a level of autonomy that is level 0, the vehicle can issue warnings and intervene momentarily but has no sustained vehicle control. With this level of autonomy, instructions 230 can be text, graphics, or other information displayed to the user in a display system in the vehicle. In this case, the user can change cruise control settings or speeds to obtain desired spacing 224 for that vehicle.

Figure 3:
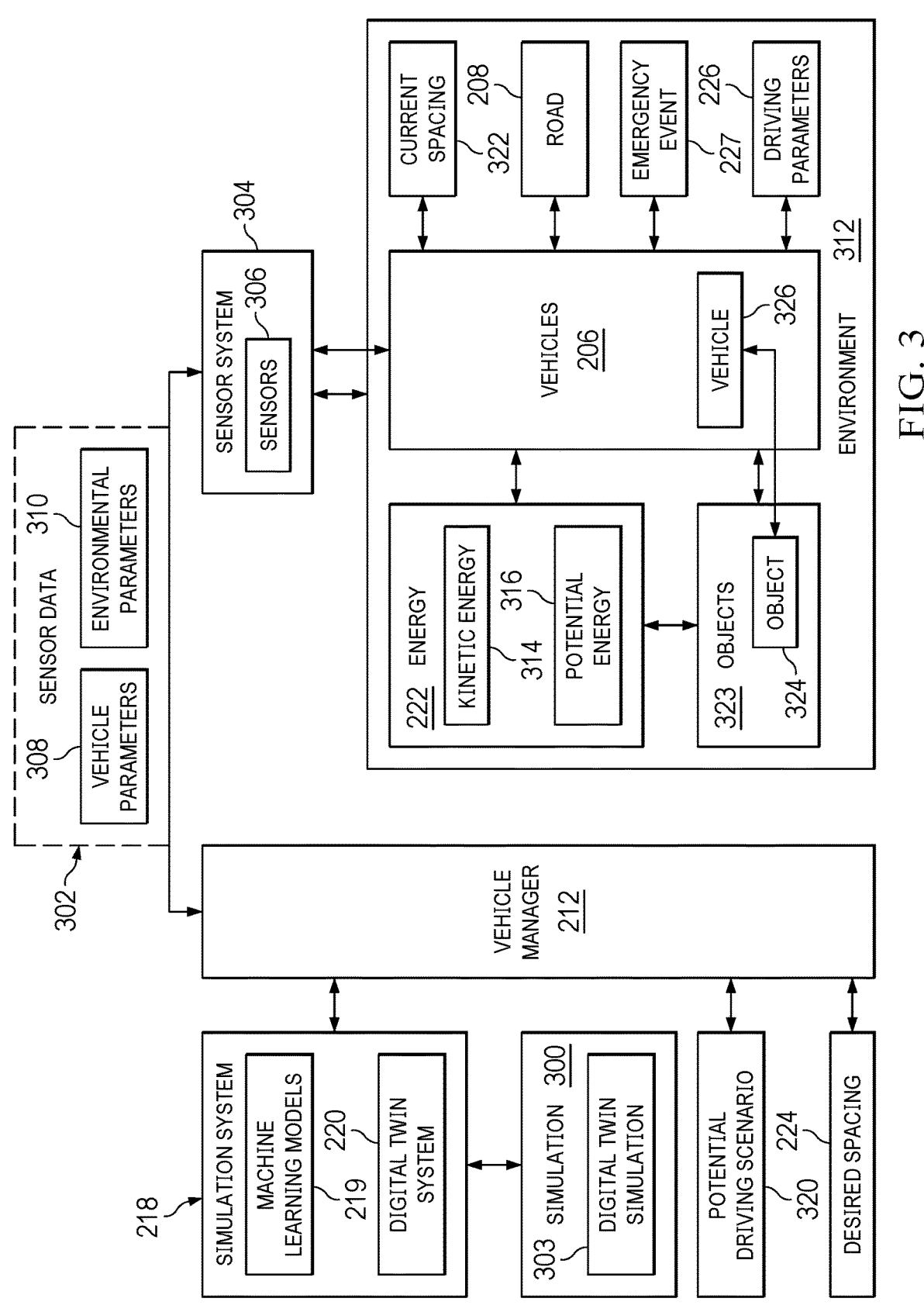
FIG. 3 is a diagram for simulating vehicles moving on the road in accordance with an illustrative embodiment.

Turning next to FIG. 3, a diagram for simulating vehicles moving on the road is depicted in accordance with an illustrative embodiment. In the illustrative examples, the same reference numeral may be used in more than one figure. This reuse of a reference numeral in different figures represents the same element in the different figures.

As depicted in this example, vehicle manager 212 can run digital twin simulation 303 for vehicles 206 moving on road 208. Digital twin simulation 303 can be run using sensor data 302 received by vehicle manager 212 from sensor system 304 for vehicles 206. Sensor data 302 can be used as inputs into simulation system 218 to run simulation 300.

In this example, sensor system 304 comprises sensors 306. Sensors 306 can be located in or on vehicles 206. Further, sensors 306 can also be located in the environment around vehicles 206 to collect sensor data 302 about the environment around vehicles 206.

For example, sensors 306 can generate sensor data 302 about vehicle parameters 308 for vehicles 206. In this illustrative example, vehicle parameters 308 can be at least one of a temperature, an oil pressure, a battery voltage, a fuel level, a speed, acceleration, a tire pressure, a fuel injector flow rate, engine revolutions per minute (RPM), a location, a direction of travel, a braking pressure, or other suitable parameters about vehicles 206. Vehicle parameters 308 can also include driving parameters 226. Additionally, sensor data 302 can also include environmental parameters 310 about environment 312 around vehicles 206 moving on road 208. In this example, environmental parameters 310 can include at least one of a temperature, a road condition of road 208, a humidity, a weather condition, or other information about environment 312 around vehicles 206.

Further, sensor data 302 can also include other types of information in addition to or in place of vehicle parameters 308 and environmental parameters 310. For example, sensor data 302 can include images and videos generated by cameras in sensors 306. These cameras can be located on vehicles 206 or can be located in environment 312 around vehicles 206.

In this depicted example, simulation 300 is a virtual representation of vehicles 206 moving on road 208. Simulation 300 is digital twin simulation 303 run using digital twin system 220. In this illustrative example, digital twin simulation 303 is virtually indistinguishable from the actual operation of vehicles 206. The current state and operation of vehicles 206 on road 208 can be mirrored using simulation system 218 to run simulation 300.

With this simulation, vehicle manager 212 can simulate the effect of potential driving scenario 320 on the current operation of vehicles 206 in simulation 300. Vehicle manager 212 can determine desired spacing 224 for vehicles 206 from energy 222 of vehicles 206 for potential driving scenario 320. Potential driving scenario 320 can include an unexpected change in driving parameters 226 that can result in emergency event 227.

In this illustrative example, the determination of desired spacing 224 involves vehicle manager 212 determining energy 222 for vehicles 206. Simulation 300 can be used by vehicle manager 212 to determine energy 222 for vehicles 206 using simulation system 218 as part of running simulation 300 of vehicles 206 moving on road 208. The determination of energy 222 can then be used to determine desired spacing 224 for vehicles 206.

As depicted, energy 222 can be determined by vehicle manager 212 using sensor data 302 and simulation 300 run by simulation system 218. Sensor data 302 can be input into simulation system 218 to run simulation 300 for vehicles 206 moving on road 208. Energy 222 for vehicles 206 can be determined as part of simulation 300.

In one illustrative example, vehicle manager 212 can determine energy 222 in the form kinetic energy 314 for each of the vehicles 206. Kinetic energy 314 for vehicle 326 in vehicles 206 can be identified using the speed of the vehicle and the characteristics of vehicle 326. In this example, characteristics of vehicle 326 is the weight of vehicle 326.

With the determination of kinetic energy 314 for vehicles 206, vehicle manager 212 can determine desired spacing 224 needed to reduce kinetic energy 314 for vehicle 326 to avoid a transfer of energy 222 from vehicles 206 to another vehicle in vehicles 206. In this example, vehicle manager 212 can run simulation 300 to determine desired spacing 224 needed to reduce kinetic energy 314 of vehicle 326 without vehicle 326 contacting or impacting another vehicle in vehicles 206. This determination of desired spacing 224 can be based on kinetic energy 314 and characteristics of vehicle 326. Characteristics of vehicle 326 can include braking performance as well as other emergency features. Braking performance can identify how far vehicle 326 will travel before achieving zero kinetic energy 314 using a braking system in vehicle 326. These braking distances can be based on the speed at which vehicle 326 travels in simulation 300.

Additionally, in determining energy 222, vehicle manager 212 can determine energy 222 in the form of potential energy 316 for vehicles 206. For example, potential energy 316 for vehicle 326 can be determined based on objects 323 being carried or towed by vehicles 206.

With potential energy 316, simulation 300 can include a transfer of energy 222 that occurs between vehicles 206 as an indirect transfer of energy 222. For example, one or more of vehicles 206 can carry or tow objects 323 that have energy 222 in the form of potential energy 316. Potential energy 316 for objects 323 can be transformed into kinetic energy 314. The kinetic energy 314 of objects 323 can be transferred to one or more of vehicles 206, resulting in an indirect transfer of kinetic energy between vehicles 206.

For example, vehicle manager 212 can use simulation system 218 to run simulation 300 to include objects 323 within vehicles 206. With simulation 300, vehicle manager 212 can determine a potential release of energy 222 in the form of potential energy 316 for objects 323 for potential driving scenario 320 with the unexpected change in driving parameters 226. The release of potential energy 316 for objects 323 in simulation 300 can result in energy 222 of objects 323 being transferred to one or more of vehicles 206 in the form of kinetic energy 314 for the movement of objects 323.

For example, potential energy 316 of object 324 in objects 323 can be transformed into kinetic energy 314 in the form of movement of object 324. This movement can occur in response to an unexpected change in driving parameters 226 or some other condition that can result in emergency event 227. Kinetic energy 314 of object 324 can be transferred to vehicle 326 in response to object 324 moving and contacting vehicle 326. This potential transfer of energy 222 by object 324 can be simulated for potential driving scenario 320 in simulation 300. Object 324 can move inside a vehicle, moves on the vehicle, fall inside the vehicle, fall out of the vehicle, or have other movement.

In the illustrative examples, vehicle manager 212 can determine desired spacing 224 that avoids potential energy 316 of object 324 being transformed into kinetic energy 314 and being transferred to vehicle 326 using the results of simulation 300 for potential driving scenario 320.

Thus, energy 222 can be kinetic energy 314, potential energy 316, or both kinetic energy 314 and potential energy 316. In this example, vehicle manager 212 can determine desired spacing 224 for vehicles 206 using energy 222 determined for vehicles in simulation 300 of potential driving scenario 320. For example, vehicle manager 212 can a determine potential release of energy 222 for potential driving scenario 320 with the unexpected change in driving parameters 226 that results in a transfer of energy 222 between vehicles 206 using current spacing 322 between the vehicles in simulation 300. In this example, the transfer of energy 222 can be the transfer of kinetic energy 314 between vehicles 206.

Potential driving scenario 320 can take a number of different forms. For example, potential driving scenario 320 can be a situation that can occur during moving of vehicles 206 on road 208. Potential driving scenario 320 can be a scenario or situation in which unexpected changes occur in driving parameters 226. These changes to driving parameters 226 can include changes in acceleration, deceleration, direction of travel, or other changes that result from maneuvers such as a sudden stop, a sudden slowdown, an unexpected lane change, swerving, or other maneuvers that results in unexpected changes in driving parameters 226. This potential driving scenario can be run in simulation 300 to determine if current spacing 322 is sufficient to avoid a transfer of energy 222 in response to emergency event 227 occurring in potential driving scenario 320.

Vehicle manager 212 can determine desired spacing 224 that avoids the transfer of energy 222 between vehicles 206 based on the results of running simulation 300 for potential driving scenario 320. In some illustrative examples, desired spacing 224 determined for potential driving scenario 320 can be current spacing 322. In other illustrative examples, desired spacing 224 can require increasing current spacing 322.

In yet another illustrative example, desired spacing 224 can be a decrease in current spacing 322. This decrease can avoid the potential release of a transfer of energy between vehicles 206 while increasing increase the efficiency in the use of road 208. For example, when desired spacing 224 reduces current spacing 322 increased density of vehicles 206. The increased density of vehicles 206 can increase the number of vehicles that can travel on the same stretch of road 208.

Vehicle manager 212 can run any number of potential driving scenarios in different simulations using simulation system 218. These simulations can be run to determine whether current spacing 322 is sufficient or if a change in current spacing 322 is needed. Further, these potential driving scenarios can be based on upcoming portions of road 208. For example, if a curve is ahead of vehicles 206 on road 208, potential driving scenario 320 can be run to include the curve in road 208. As result, current spacing 322 may change because of the change in environmental parameters 310 from upcoming curve in road 208.

Thus, one or more of illustrative examples provide one or more solutions that overcome a problem with spacing vehicles to reduce unintended contact between vehicles that transfers energy between vehicles. As a result, one or more solutions may provide an ability to manage spacing for vehicles that reduces undesired transfers of energy such as accidents or collusions.

Computer system 210 can be configured to perform at least one of the steps, operations, or actions described in the different illustrative examples using software, hardware, firmware or a combination thereof. As a result, computer system 210 operates as a special purpose computer system in which vehicle manager 212 in computer system 210 enables determining a desired spacing for vehicles that reduces undesired transfers of energy for vehicles moving on a road. In particular, vehicle manager 212 transforms computer system 210 into a special purpose computer system as compared to currently available general computer systems that do not have vehicle manager 212.

In the illustrative example, the use of vehicle manager 212 in computer system integrates processes into a practical application for method determines a desired spacing for vehicles. Vehicle manager 212 in computer system 210 is directed to a practical application of processes integrated into vehicle manager 212 in computer system 210 that determines a desired spacing for vehicles based on the energy in the vehicles. In the illustrative example, the energy determined can be at least one of kinetic energy for the vehicles or potential energy associated with the vehicles.

For example, a digital twin simulation of vehicles moving on a road can be run by vehicle manager 212. With the simulation, desired spacing among the vehicles can be determined and accordingly the vehicles can be repositioned on the road with the desired spacing such that undesired accidents can be reduced or avoided. Further, with this spacing smooth or desired traffic flow traffic flow can occur.

In the illustrative example, vehicle manager 212 identifies kinetic energy and potential energy for each vehicle. Vehicle manager 212 can run simulations for various potential driving scenarios to determine if an unexpected change in driving parameters can occur and if an undesired transfer of energy from one vehicle to another vehicle can occur. The simulations can be used to determine desired spacing between vehicles. With the desired spacing, actions can be performed to obtain the desired spacing. For example, actions can include reducing the speed, increasing speed, changing lanes, or performing other actions to obtain desired spacing between vehicles.

Further, the simulations can also be used to recommend actions with respect to objects carried or pulled by the vehicles. For example, recommendations regarding at least one of loading, packaging, positioning, or other recommendations can be made to maintain the integrity of objects as well as appropriate driving parameters to obtain desired spacing that reduces potential transfers of energy between objects and vehicles.

The illustration of vehicle environment 200 in in the different components in this environment in FIGS. 2-3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, vehicle manager 212 can be located in one or more of vehicles 206. With this example, vehicle manager 212 can be distributed and run in computers for vehicles 206. These computers can form computer system 210 and communicate with each other to perform simulations and determine desired spacing 224. In another illustrative example, vehicle manager 212 can determine desired spacing for different groups of vehicles on different roads in addition to or in place of vehicles 206 moving on road 208.

Potential energy 316 then changes into kinetic energy 314. For example, sudden braking may cause a barrel in the bed of a pickup truck to shift in a forward direction relative to the pickup truck. Potential energy of the barrel can be transferred to the pickup truck when the barrel shifts and contacts the back of the pickup truck. In this example, the potential energy of the barrel is transformed into kinetic energy with the barrel shifting into the back of the pickup truck.

Figure 4:
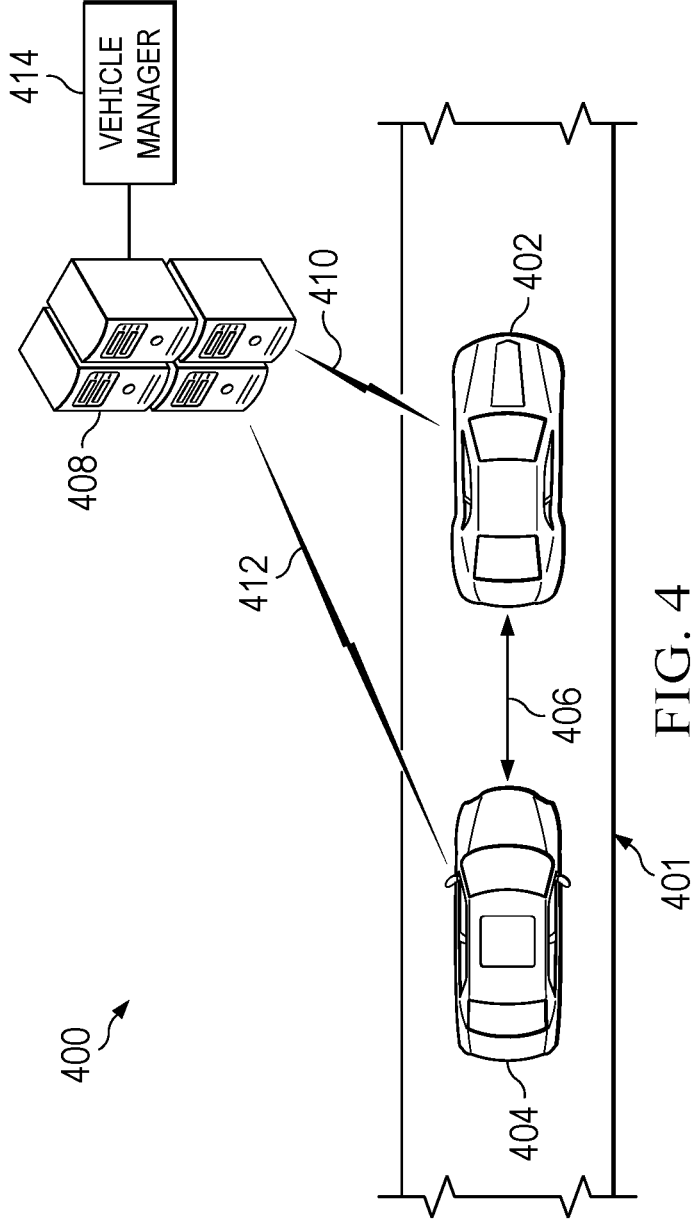
FIG. 4 is an illustration of spacing for vehicles in accordance with an illustrative embodiment.

With reference to FIG. 4, an illustration of spacing for vehicles is depicted in accordance with an illustrative embodiment. As depicted, vehicles 400 are moving on road 401. Vehicles 400 are automobile 402 and automobile 404 in this example, spacing 406 is present between automobile 402 and automobile 404.

As depicted, server computer 408 is in communication with automobile 402 using wireless communications link 410 and with automobile 404 using wireless communications link 412. Server computer 408 receives sensor data from vehicles 400 over these wireless communications links. These wireless communications links can be cellular signals, Wi-Fi signals, satellite signals, or other suitable types of wireless signals.

In this example, vehicle manager 414 is located on server computer 408 and is an example of vehicle manager 212 in FIG. 2. Vehicle manager 414 uses the sensor data received from vehicles 400 to run a digital twin simulation that simulates vehicles 400 moving on road 401. This digital twin simulation is a digital representation of vehicles 400 moving on road 401.

With the simulation, vehicle manager 414 can determine the energy of vehicles 400. Further, with this determination, vehicle manager 414 can run various scenarios in the digital twin simulation. The scenarios are what if scenarios to determine potential transfer of energy between vehicles 400 that can be used to determine a desired spacing between automobile 402 and automobile 404.

In this illustrative example, vehicle manager 414 can run simulations on a digital twin of vehicles 400. The simulations can be for potential scenarios that may occur for vehicles 400 on road 401. For example, one potential driving scenario is a sudden braking or stopping of automobile 402.

In this example, kinetic energy is determined for both vehicles. In this example, the kinetic energy for a vehicle is the weight of the vehicle and the speed of the vehicle. In this example, the current speed of automobile 404 can be obtained from sensor data over wireless communications link 412. The simulation can be for a sudden stopping of automobile 402 in front of automobile 404. Changing spacing 406 is simulated as automobile 402 suddenly stops and automobile 404 performs emergency braking.

In this depicted example, the kinetic energy of automobile 404 is used to determine whether automobile 404 can avoid spacing 406 reaching zero before automobile 404 can stop to avoid transferring kinetic energy to automobile 402. The simulation performed by vehicle manager 414 can be for automobile 402 stopping immediately because of an impact with another object or automobile 402 slowing down suddenly without stopping.

The stopping distance needed for automobile 404 in response to a sudden deceleration or stopping of automobile 402 can be used to determine desired spacing for spacing 406. In this example, the stopping distance for automobile 404 can be based on the kinetic energy of the automobile 404 and the braking performance of automobile 404. In this example, the stopping distance is the distance needed for the kinetic energy of automobile 404 to reach zero on road 401.

If spacing 406 at the current value is insufficient to avoid an impact that transfers kinetic energy, then spacing 406 can be increased. This increase in spacing 406 can be determined through the simulation performed by vehicle manager 414.

In another example of a potential driving scenario, the simulation can be performed for a sudden deceleration of automobile 402 without automobile 402 stopping. In this example, the simulation simulates a sudden deceleration of automobile 402 without stopping suddenly. The simulation determines whether automobile 404 at the current speed and spacing 406 can slow down sufficiently to avoid spacing 406 from reaching zero and transferring kinetic energy to automobile 402.

In this illustrative example, the different determinations of desired spacing for vehicles 400 are based on the current speeds and spacings between vehicles 400. As vehicles 400 change speed, the desired spacings can change. Further, as environmental conditions around vehicles 400 change, the desired spacing also can change. For example, when additional vehicles are detected on road 401 ahead and behind vehicles 400, these vehicles can also be taken into account in determining spacing 406 between automobile 404 and automobile 402. The scenario can also determine desired spacings for these additional vehicles on road 401.

Figure 5:
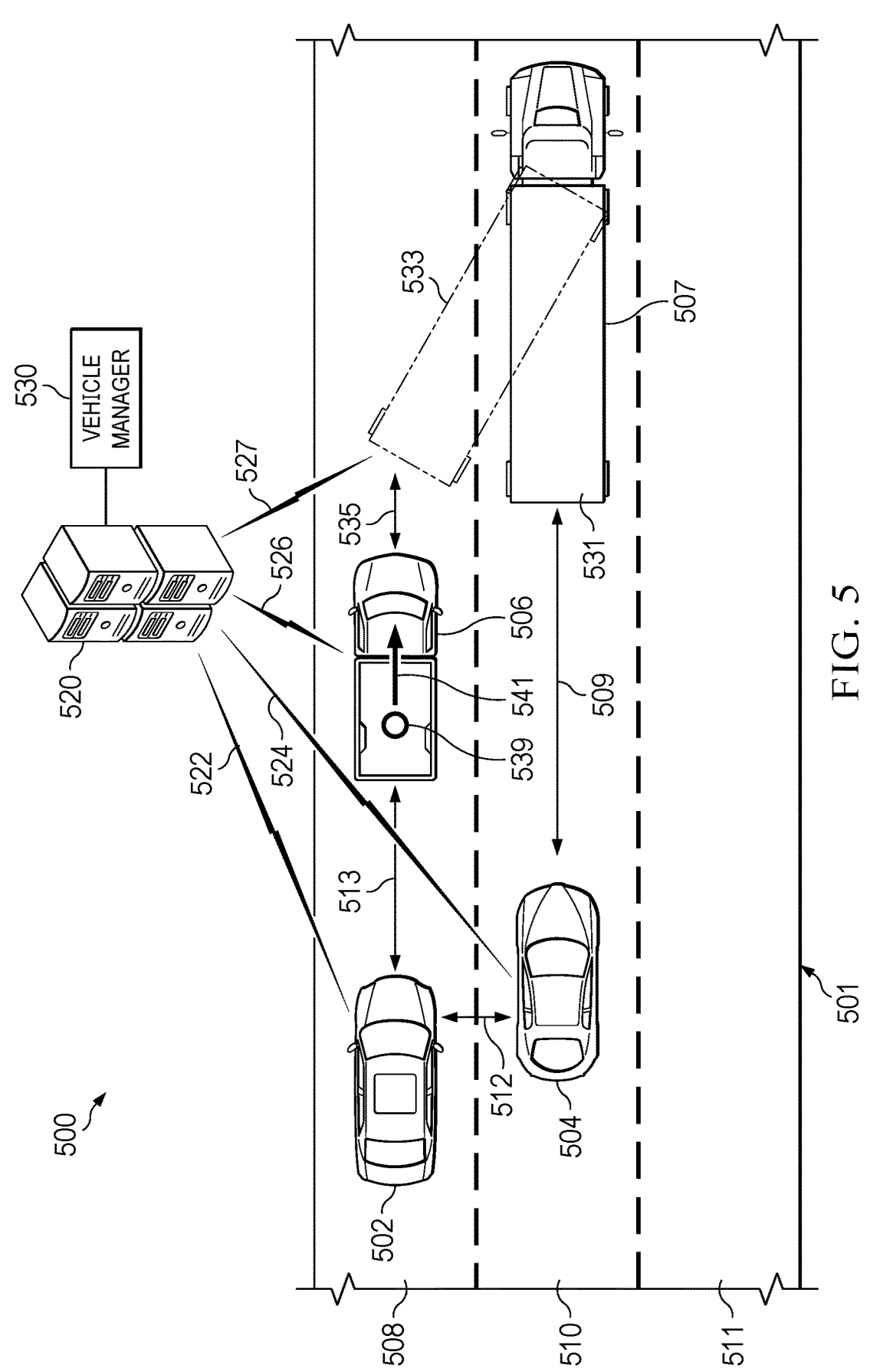
FIG. 5 is another illustration of spacing for vehicles in accordance with an illustrative embodiment.

Turning to FIG. 5, another illustration of spacing for vehicles is depicted in accordance with an illustrative embodiment. As depicted, vehicles 500 are moving on road 501. Vehicles 500 are automobile 502, automobile 504, pickup truck 506, and semi-trailer truck 507. In this example, road 501 has three lanes, left lane 508 center lane 510, and right lane 511. As depicted, automobile 502 and pickup truck 506 are moving on left lane 508 while automobile 504 and semi-trailer truck 507 are moving in center lane 510.

In this example, spacing 513 is present between automobile 502 and pickup truck 506. Spacing 509 is present between automobile 504 and semi-trailer truck 507. Spacing 512 is present between automobile 502 and automobile 504. As can be seen, spacing can be between vehicles in the same lane for between vehicles in different lanes. In other words, front to back spacing and side-by-side spacing can be present between vehicles.

In this illustrative example, server computer 520 is in communication with vehicles 500. As depicted, server computer 520 is in communication with automobile 502 using wireless communications link 522. As depicted, server computer 520 is in communication with automobile 504 using wireless communications link 524, and server computer 520 is in communication with pickup truck 506 using wireless communications link 526. In this depicted example, server computer 520 is in communication with semi-trailer truck 507 using wireless communications link 527. Server computer 520 receives sensor data from vehicles 500 over these wireless communications links.

In this example, vehicle manager 530 is located on server computer 520 and is an example of vehicle manager 212 in FIG. 2. In this example, vehicle manager 530 can run simulations of vehicles 500 on road 501 using a digital twin system. Vehicle manager 530 can perform simulation for different potential driving scenarios that can occur using vehicles 500 in the current state on road 501.

These simulations are based on the current speeds and spacings between vehicles 500. This information can be determined from sensor data received over the different wireless communications links.

In one illustrative example, a potential driving scenario involves semi-trailer truck 507 braking suddenly such that a jackknife skid occurs in which trailer 531 swings at an angle such as 45° from the truck as shown by position 533. In this example, this driving scenario can result in the trailer swerving into left lane 508 while the truck portion remains in center lane 510. With this driving scenario, spacing 535 is the spacing from pickup truck 506 to trailer 531 in position 533.

In this driving scenario with pickup truck 506 and semi-trailer truck 507, the kinetic energy is determined for both vehicles using the weight and speed of the vehicles. Further, other factors such as road conditions, coefficient of friction for skidding, and other factors are considered to determine how quickly semi-trailer truck 507 stops or slows down. Additionally, the kinetic energy of pickup truck 506 is used to determine how quickly pickup truck 506 can slow down such that spacing 535 between pickup truck 506 and trailer 531 for semi-trailer truck 507 does not reach zero.

As another example, with pickup truck 506 slowing down suddenly to avoid transferring energy from pickup truck 506 to semi-trailer truck 507, another driving scenario can occur involving barrel 539 in the bed of pickup truck 506. In this example, barrel 539 has a potential energy to change to kinetic energy with the slowing down of pickup truck 506. The potential energy can turn into kinetic energy that results in barrel 539 moving in the direction of arrow 541 that can cause the kinetic energy of barrel 539 to be transferred to pickup truck 506. With this potential driving scenario involving semi-trailer truck 507 and pickup truck 506 with barrel 539, vehicle manager 530 can determine the desired spacing for spacing 535 to avoid pickup truck 506 from transferring kinetic energy to semi-trailer truck 507 and to avoid barrel 539 from transforming its potential energy into kinetic energy that is transferred to pickup truck 506.

In yet another illustrative example, vehicle manager 530 can run a simulation with respect to potential sudden braking for both semi-trailer truck 507 and pickup truck 506. With the simulation, desired spacing may be changed for spacing 512 such that automobile 504 changes lane from center lane 510 to right lane 511 to obtain desired spacing for spacing 512 in the event of a potential driving scenario in which both semi-trailer truck 507 and pickup truck 506 suddenly apply brakes.

In this illustrative example, the different determinations of desired spacing for vehicles 500 are based on the current speeds and spacings between vehicles 500. As vehicles 500 change speed, the desired spacings can change. Further, as environmental conditions around vehicles 500 change the desired spacing also can change. For example, rain can increase the desired spacings. As another example, if the surface of road 501 changes to become less ideal, the desired spacing between vehicles 500 can also increase.

Further, additional potential driving scenarios can be run using simulations by vehicle manager 530 in addition to the ones described. For example, another potential driving scenario can involve barrel 539 falling out of pickup truck 506. With this potential driving scenario, the simulation can determine desired spacing for spacing 513 that allows automobile 502 to avoid contact with barrel 539 in a manner that undesired transfers of energy occur between barrel 539 and automobile 502. As yet another example, simulations can be performed for changes in road 501 such as the addition of lanes, subtraction of lanes, and deterrence in road 501.

Figure 6:
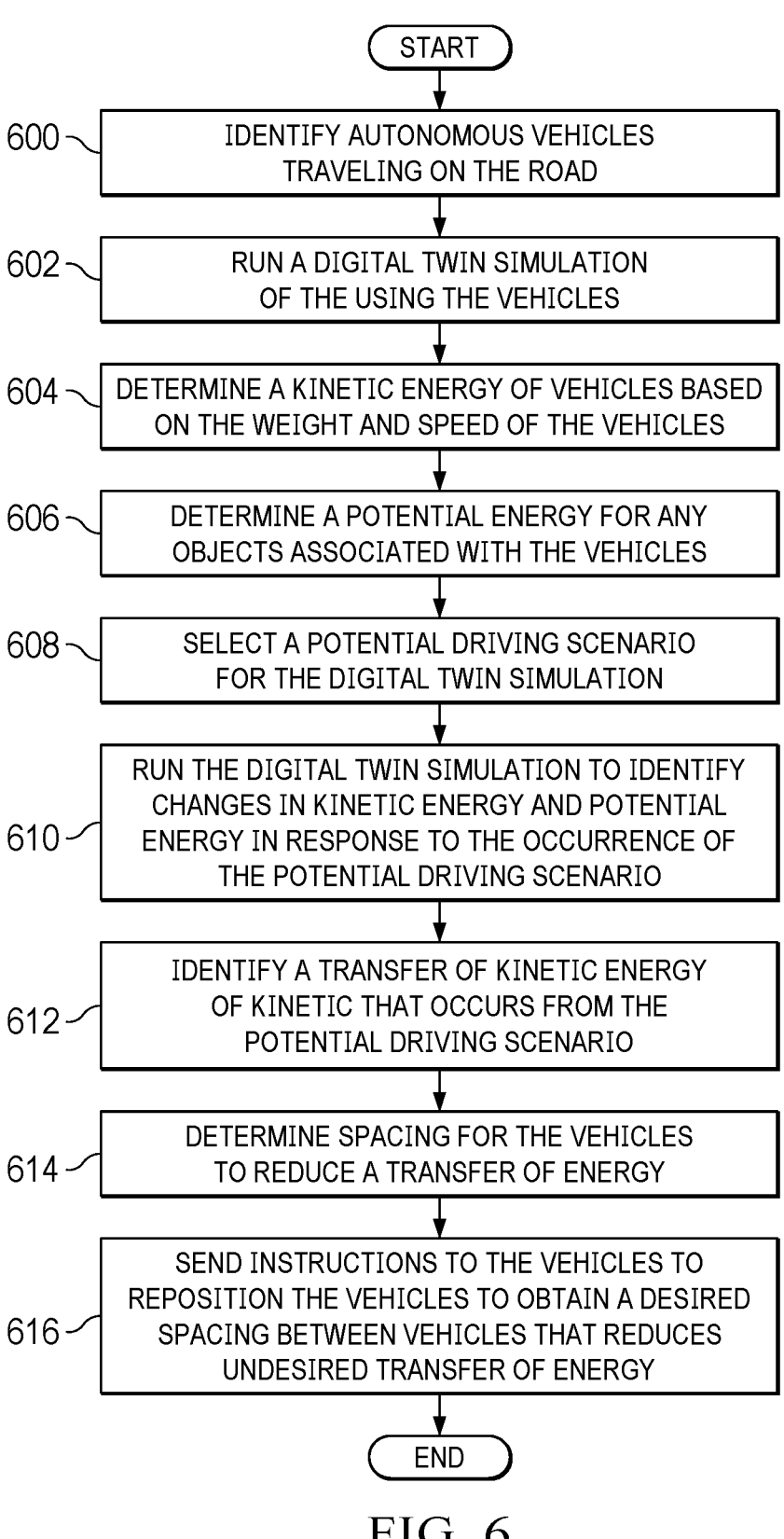
FIG. 6 is a flowchart of a process for managing spacing between vehicles in accordance with an illustrative embodiment.

With reference to FIG. 6, a flowchart of a process for managing spacing between vehicles is depicted in accordance with an illustrative embodiment. The process in FIG. 6 can be implemented in hardware, software, or both. When implemented in software, the process can take the form of program instructions that is run by one of more processor units located in one or more hardware devices in one or more computer systems. For example, the process can be implemented in vehicle manager 212 in computer system 210 in FIG. 2.

The process begins by identifying autonomous vehicles traveling on the road (step 600). In step 600, these autonomous vehicles can be identified based on receiving sensor data from the autonomous vehicles. The process runs a digital twin simulation of the vehicles (step 602). In step 602, the simulation continuously receives sensor data from the vehicles such that the digital twin simulation is a current representation of the state of the vehicles. In this example, the digital twin simulation continues to run using sensor data received from vehicles during this process in FIG. 6.

The process determines a kinetic energy of vehicles based on the weight and speed of the vehicles (step 604). In step 604, this kinetic energy is determined for each vehicle in the vehicles. The process determines a potential energy for any objects associated with the vehicles (step 606). In step 606, the objects can be located in a vehicle or can be towed by a vehicle. The potential energy is determined for each of these objects in this example. Objects in a vehicle can be, for example, cargo, a barrel, a pipe, a tire, or other objects. Objects that are towed can be, for example, a trailer, a car, or other suitable objects. The objects can also include loose items in the vehicles. For example, loose items can be a laptop bag, a box, or other items that may be carried within a vehicle.

The process selects a potential driving scenario for the digital twin simulation (step 608). In step 608, the potential driving scenario is a driving scenario for which an unexpected change in driving parameters can occur such deceleration, acceleration, change in direction, or other changes in parameters. The potential driving scenario may involve, for example, a sudden application of brakes by one or more vehicles, a vehicle suddenly stopping, the sudden acceleration, or other potential driving scenarios.

In step 608, the potential driving scenario can also take into account the environment around the vehicles. For example, the road may a curve, an increase in lanes, a decrease in lanes, an incline, a decline, debris, or other changes.

Further, the potential driving scenario can be selected prior to encountering these changes based on road information for the road received from a mapping platform. This mapping platform can be, for example, Google Maps, Waze, or some other mapping platform. Google Maps is available from Google LLC, and Waze is available from Waze a subsidiary of Google LLC. Further, the driving scenario can also be selected based on weather conditions. For example, a potential driving scenario can be changed to include rain, for example, if rain is present ahead of the vehicles or is predicted to start.

The process runs the digital twin simulation to identify changes in kinetic energy and potential energy in response to the occurrence of the potential driving scenario (step 610).

The process identifies a transfer of kinetic energy that occurs from the potential driving scenario (step 612). In this example, the transfer of kinetic energy can be between vehicles when a vehicle contacts another vehicle. As another example, the transfer kinetic energy can be between the vehicle and an object that moves in the potential driving scenario. The movement of the object transforms the potential energy of the object into kinetic energy in this example.

The process determines spacing for the vehicles to reduce a transfer of energy (step 614). The process sends instructions to the vehicles to reposition the vehicles to obtain a desired spacing between vehicles that reduces undesired transfer of energy (step 616). The process terminates thereafter. The repositioning of the vehicles can be increasing spacing, decreasing spacing, change in lanes, or other types of repositioning of the vehicles.

This process can be repeated for a number of different types of potential driving situations that can be encountered by the vehicles moving on the road. For example, the potential driving scenario can be based on a straight road, a curved road, an incline, a decline, or some configuration of the road. Further, the potential driving situations can also be based on environmental conditions such as the amount of light, weather, and other environmental conditions that can affect desired spacing between vehicles.

Figure 7:
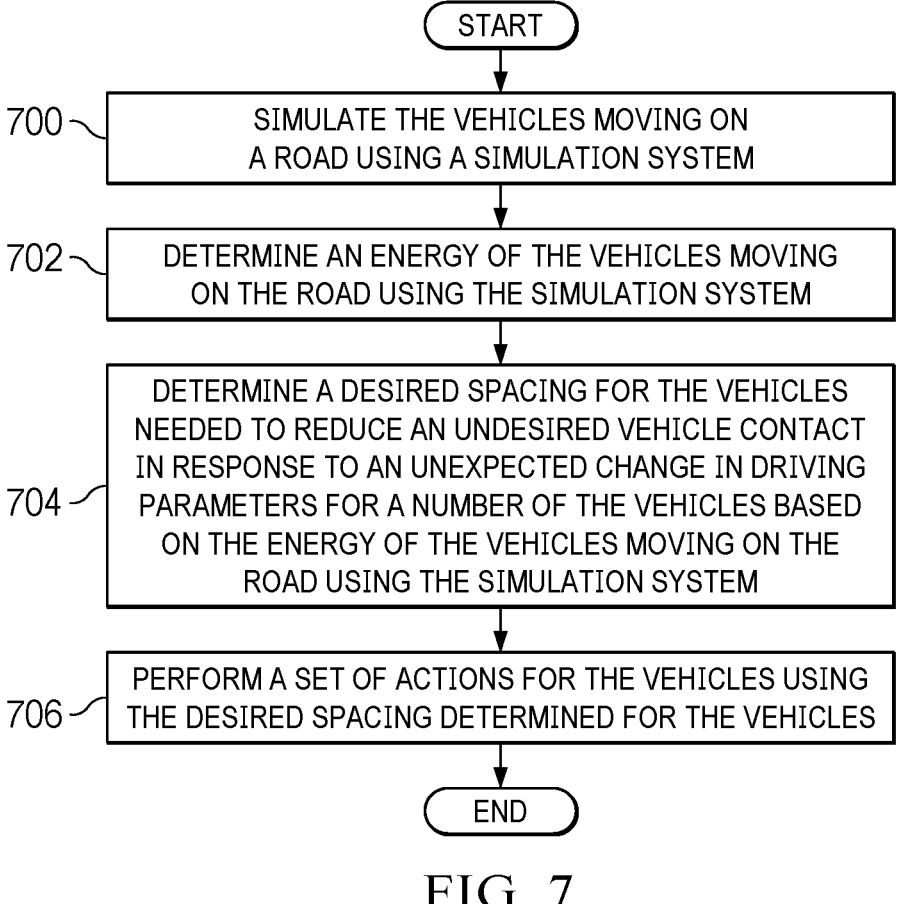
FIG. 7 is a flowchart of a process for spacing vehicles in accordance with an illustrative embodiment.

Turning next to FIG. 7, a flowchart of a process for spacing vehicles is depicted in accordance with an illustrative embodiment. The process in FIG. 7 can be implemented in hardware, software, or both. When implemented in software, the process can take the form of program instructions that is run by one of more processor units located in one or more hardware devices in one or more computer systems. For example, the process can be implemented in vehicle manager 212 in computer system 210 in FIG. 2.

The process begins by simulating the vehicles moving on a road using a simulation system (step 700). In step 700, the simulation system is a digital twin system. The process determines an energy of the vehicles moving on the road using the simulation system (step 702).

The process determines a desired spacing for the vehicles needed to reduce an undesired vehicle contact in response to an unexpected change in driving parameters for a number of the vehicles based on the energy of the vehicles moving on the road using the simulation system (step 704).

The process performs a set of actions for the vehicles using the desired spacing determined for the vehicles (step 706). The process terminates thereafter.

With reference to FIG. 8, a flowchart of a process for determining the energy of vehicles is depicted in accordance with an illustrative embodiment. The process in this figure is an example of an implementation of step 702 in FIG. 7.

The process begins by determining a kinetic energy for each of the vehicles (step 800). The process determines a potential energy for each of the vehicles (step 802). The process terminates thereafter.

Turning next to FIG. 9, a flowchart of a process for determining a desired between vehicles is depicted in accordance with an illustrative embodiment. The process illustrated in FIG. 9 is an example of one implementation for step 704 in FIG. 7.

The process begins by determining a potential release of the energy for a potential driving scenario with the unexpected change in the driving parameters that results in a transfer of kinetic energy between the vehicles using a current spacing between the vehicles (step 900). The process determines the desired spacing that avoids the transfer of the kinetic energy between the vehicles (step 902). The process terminates thereafter.

Figure 10:
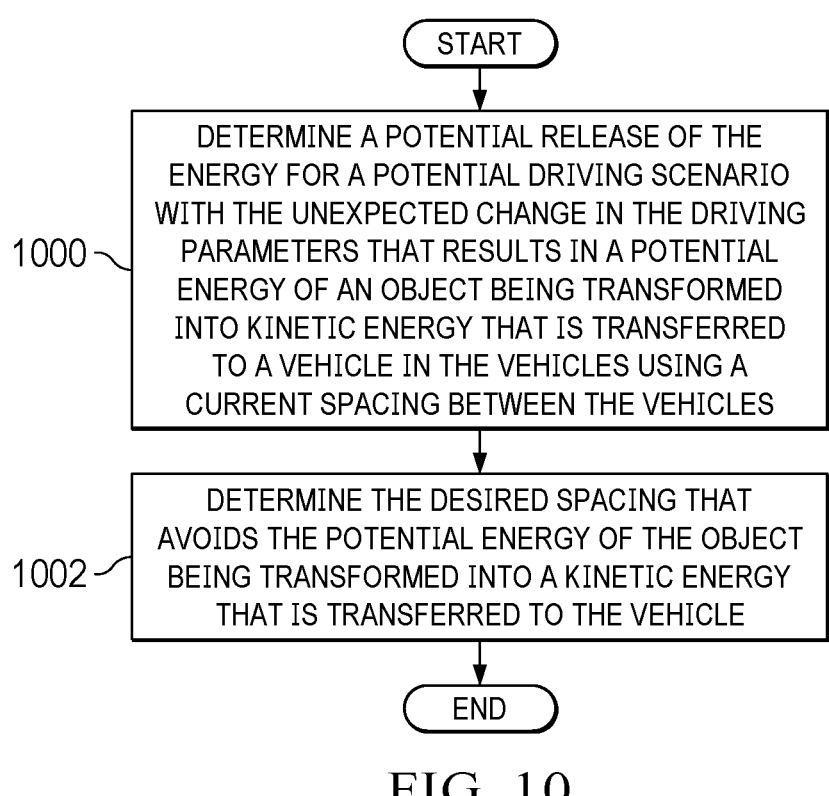
FIG. 10 is a flowchart of a process for determining a desired between vehicles in accordance with an illustrative embodiment.

With reference to FIG. 10, a flowchart of a process for determining a desired between vehicles is depicted in accordance with an illustrative embodiment. The process illustrated in FIG. 10 is an example of one implementation for step 704 in FIG. 7.

The process begins by determining a potential release of the energy for a potential driving scenario with the unexpected change in the driving parameters that results in a potential energy of an object being transformed into kinetic energy that is transferred to a vehicle in the vehicles using a current spacing between the vehicles (step 1000). The process determines the desired spacing that avoids the potential energy of the object being transformed into a kinetic energy that is transferred to the vehicle (step 1002). The process terminates thereafter.

Figure 11:
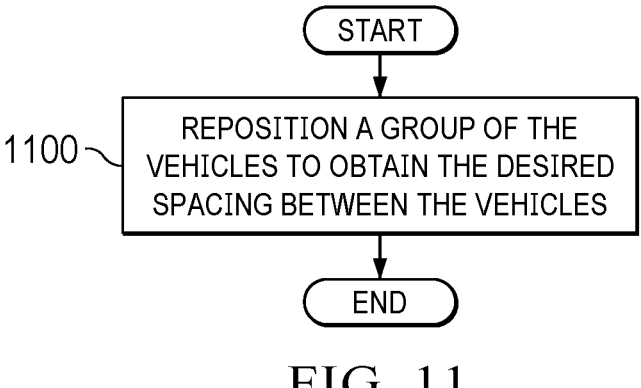
FIG. 11 is a flowchart of a process for performing a set of actions in accordance with an illustrative embodiment.

In FIG. 11, a flowchart of a process for performing a set of actions is depicted in accordance with an illustrative embodiment. The process in FIG. 11 is an example of one implementation for step 706 in FIG. 7.

The process repositions a group of the vehicles to obtain the desired spacing between the vehicles (step 1100). The process terminates thereafter.

Figure 12:
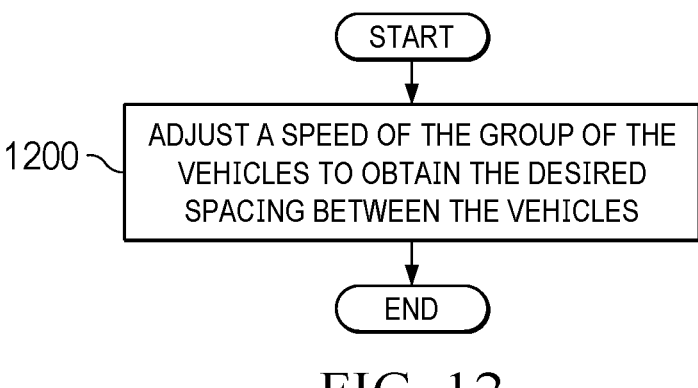
FIG. 12 is a flowchart of a process for repositioning a group of vehicles in accordance with an illustrative embodiment.

Turning to FIG. 12, a flowchart of a process for repositioning a group of vehicles is depicted in accordance with an illustrative embodiment. The process in FIG. 12 is an example of one implementation for step 1100 in FIG. 11.

The process adjusts a speed of the group of the vehicles to obtain the desired spacing between the vehicles (step 1200). The process terminates thereafter.

Figure 13:
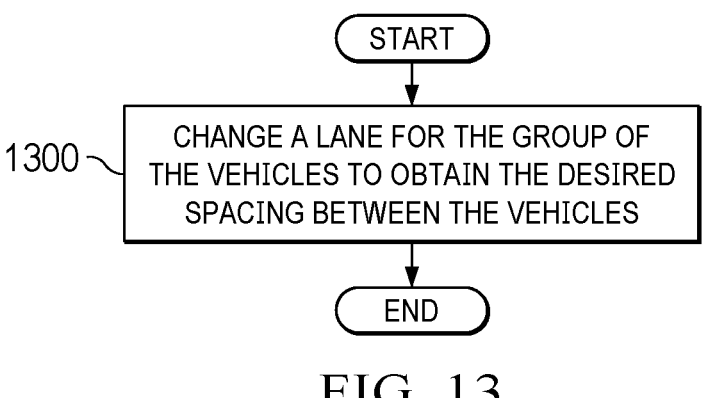
FIG. 13 is a flowchart of a process for repositioning a group of vehicles in accordance with an illustrative embodiment.

With reference next to FIG. 13, a flowchart of a process for repositioning a group of vehicles is depicted in accordance with an illustrative embodiment. The process in FIG. 13 is an example of one implementation for step 1100 in FIG. 11.

The process changes a lane for the group of the vehicles to obtain the desired spacing between the vehicles (step 1300). The process terminates thereafter.

Figure 14:
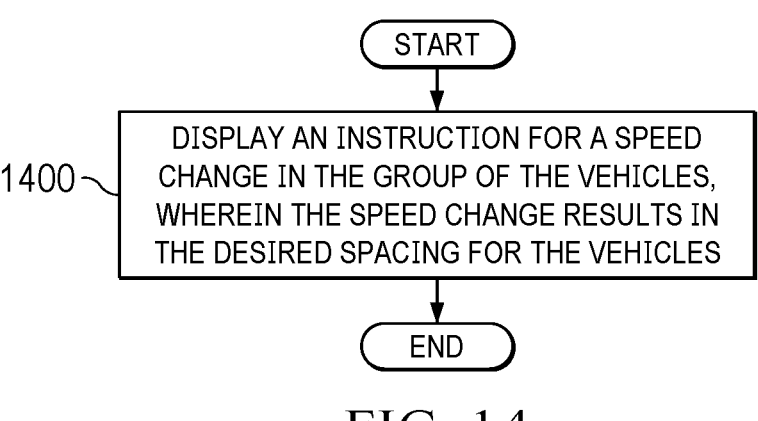
FIG. 14 is a flowchart of a process for repositioning a group of vehicles is depicted in accordance with an illustrative embodiment.

Turning to FIG. 14, a flowchart of a process for repositioning a group of vehicles is depicted in accordance with an illustrative embodiment. The process in FIG. 14 is an example of one implementation for step 1100 in FIG. 11.

The process displays an instruction for a speed change in the group of the vehicles, wherein the speed change results in the desired spacing for the vehicles (step 1400). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 15:
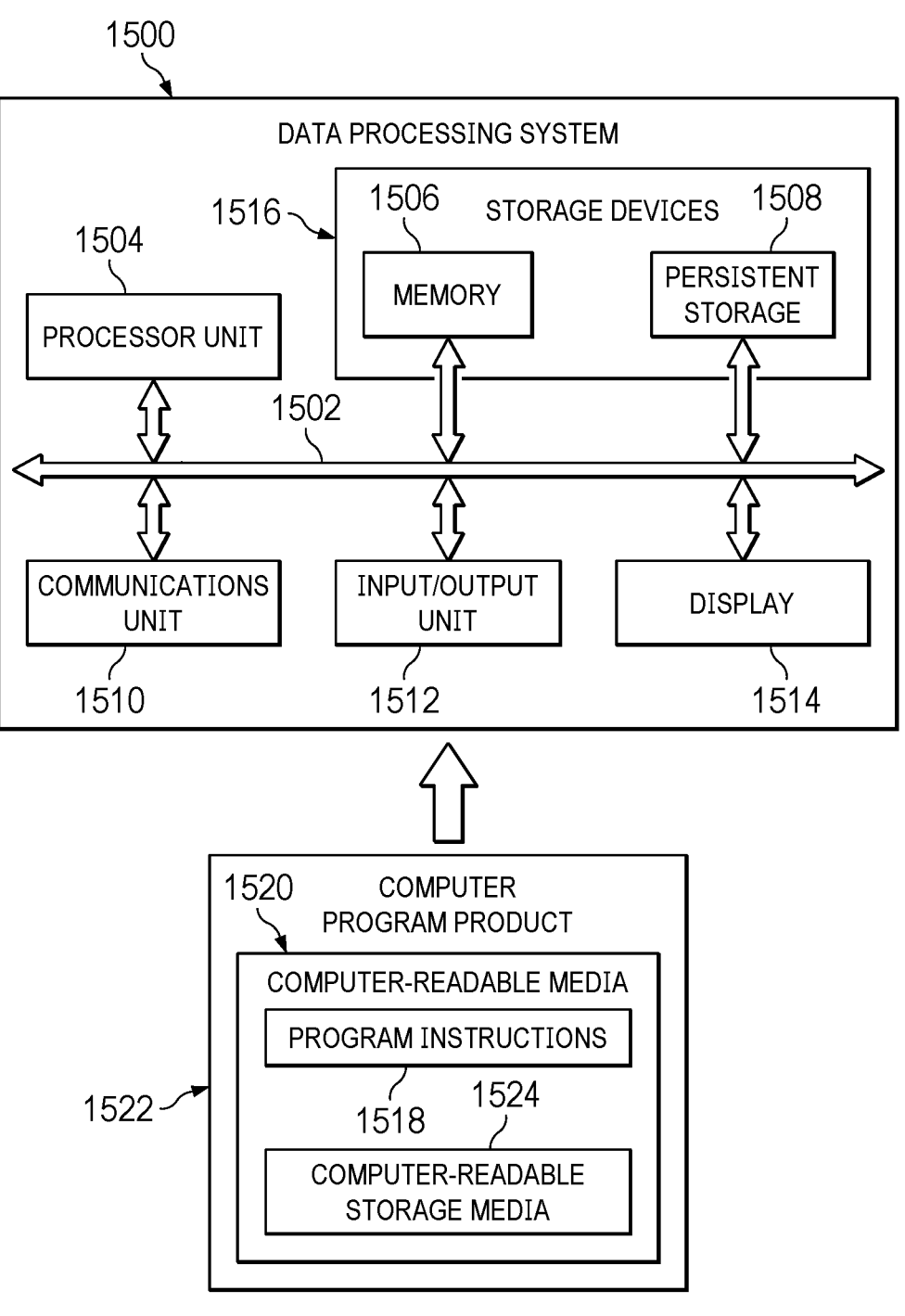
FIG. 15 is a block diagram of a data processing system in accordance with an illustrative embodiment.

Turning now to FIG. 15, a block diagram of a data processing system is depicted in accordance with an illustrative embodiment. Data processing system 1500 can be used to implement computers and computing devices in computing environment 100 in FIG. 1. Data processing system 1500 can also be used to implement computer system 210 in FIG. 2, server computer 408 in FIG. 4, and server computer 520 in FIG. 5. Further, data processing system 1500 can be used to implement computers within the different vehicles such as vehicles 206 in FIGS. 2-3, vehicles 400 in FIG. 4, and vehicles 500 in FIG. 5. In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 takes the form of a bus system.

Processor unit 1504 serves to execute instructions for software that can be loaded into memory 1506. Processor unit 1504 includes one or more processors. For example, processor unit 1504 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1504 can may be implemented using one or more heterogeneous processor systems in which a main processor is present with secondary processors on a single chip. As another illustrative example, processor unit 1504 can be a symmetric multi-processor system containing multiple processors of the same type on a single chip.

Memory 1506 and persistent storage 1508 are examples of storage devices 1516. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1516 may also be referred to as computer readable storage devices in these illustrative examples. Memory 1506, in these examples, can be, for example, a random-access memory or any other suitable volatile or non-volatile storage device. Persistent storage 1508 may take various forms, depending on the particular implementation.

For example, persistent storage 1508 may contain one or more components or devices. For example, persistent storage 1508 can be a hard drive, a solid-state drive (SSD), a flash memory, a rewritable optical disk, a rewritable magnetic tape, or some combination of the above. The media used by persistent storage 1508 also can be removable. For example, a removable hard drive can be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that can be connected to data processing system 1500. For example, input/output unit 1512 may provide a connection for user input through at least one of a keyboard, a mouse, or some other suitable input device. Further, input/output unit 1512 may send output to a printer. Display 1514 provides a mechanism to display information to a user.

Instructions for at least one of the operating system, applications, or programs can be located in storage devices 1516, which are in communication with processor unit 1504 through communications framework 1502. The processes of the different embodiments can be performed by processor unit 1504 using computer-implemented instructions, which may be located in a memory, such as memory 1506.

These instructions are referred to as program instructions, computer usable program instructions, or computer readable program instructions that can be read and executed by a processor in processor unit 1504. The program instructions in the different embodiments can be embodied on different physical or computer readable storage media, such as memory 1506 or persistent storage 1508.

Program instructions 1518 is located in a functional form on computer readable media 1520 that is selectively removable and can be loaded onto or transferred to data processing system 1500 for execution by processor unit 1504. Program instructions 1518 and computer readable media 1520 form computer program product 1522 in these illustrative examples. In the illustrative example, computer readable media 1520 is computer readable storage media 1524.

Computer readable storage media 1524 is a physical or tangible storage device used to store program instructions 1518 rather than a medium that propagates or transmits program instructions 1518. Computer readable storage media 1524, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1518 can be transferred to data processing system 1500 using a computer readable signal media. The computer readable signal media are signals and can be, for example, a propagated data signal containing program instructions 1518. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1520" can be singular or plural. For example, program instructions 1518 can be located in computer readable media 1520 in the form of a single storage device or system. In another example, program instructions 1518 can be located in computer readable media 1520 that is distributed in multiple data processing systems. In other words, some instructions in program instructions 1518 can be located in one data processing system while other instructions in program instructions 1518 can be located in one data processing system. For example, a portion of program instructions 1518 can be located in computer readable media 1520 in a server computer while another portion of program instructions 1518 can be located in computer readable media 1520 located in a set of client computers.

The different components illustrated for data processing system 1500 are not meant to provide architectural limitations to the manner in which different embodiments can be implemented. In some illustrative examples, one or more of the components may be incorporated in or otherwise form a portion of, another component. For example, memory 1506, or portions thereof, may be incorporated in processor unit 1504 in some illustrative examples. The different illustrative embodiments can be implemented in a data processing system including components in addition to or in place of those illustrated for data processing system 1500. Other components shown in FIG. 15 can be varied from the illustrative examples shown. The different embodiments can be implemented using any hardware device or system capable of running program instructions 1518.

Thus, illustrative embodiments provide a computer implemented method, computer system, and computer program product for spacing vehicles. A computer system simulates the vehicles moving on a road using a simulation system. The computer system determines an energy of the vehicles moving on the road using the simulation system. The computer system determines a desired spacing for the vehicles needed to reduce an undesired vehicle contact in response to an unexpected change in driving parameters for a number of the vehicles based on the energy of the vehicles moving on the road using the simulation system. The computer system performs a set of actions for the vehicles using the desired spacing determined for the vehicles.

As a result, an illustrative example can reduce or avoid an unintentional transfer of energy between vehicles occurring in response to emergency events. In the illustrative example, the reduction in unintentional transfer of energy can occur by reducing or avoiding contact between vehicles in the emergency events. Additionally, the reduction of unintentional transfer of energy can also occur by reducing or avoiding contact between objects carried or towed by vehicles with other vehicles.

In the illustrative example, the reduction in contact between vehicles can occur through determining desired spacing for the vehicles. Instructions can be sent to the vehicles to change current spacing for the vehicles to the desired spacing for the vehicles. With autonomous vehicles, these instructions can be program code, commands, data, values, or other information that can be used by computers in the vehicles to change the current spacing of the vehicles. With vehicles that are driver controlled, the instructions can be text that is presented to the driver through a display or audio system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for spacing multiple independent vehicles, the computer implemented method comprising:

simulating, by a computer system, the vehicles moving on a road using a simulation system;

determining, by the computer system, an energy of the vehicles moving on the road using the simulation system, wherein the energy of the vehicles comprises kinetic energy and potential energy;

determining, by the computer system, a desired spacing for the vehicles needed to reduce an undesired vehicle contact in response to an unexpected change in driving parameters for a number of the vehicles based on the energy of the vehicles moving on the road using the simulation system; and performing, by the computer system, a set of actions for that cause physical repositioning of the vehicles on the road using the desired spacing determined for the vehicles, wherein determining, by the computer system, the desired spacing between the vehicles needed to reduce the undesired vehicle contact in response to the unexpected change in the driving parameters for the number of the vehicles based on the energy of the vehicles using the simulation system comprises:

determining, by the computer system, a potential release of the energy for a potential driving scenario with the unexpected change in the driving parameters that results in a transfer of the kinetic energy between the vehicles using a current spacing between the vehicles; and determining, by the computer system, the desired spacing that avoids the transfer of the kinetic energy between the vehicles.

2. The computer implemented method of claim 1, wherein determining, by the computer system, the desired spacing between the vehicles needed to reduce the undesired vehicle contact in response to the unexpected change in the driving parameters for the number of the vehicles based on the energy of the vehicles using the simulation system comprises:

determining, by the computer system, a potential release of the energy for a potential driving scenario with the unexpected change in the driving parameters that results in a potential energy of an object being transformed into kinetic energy that is transferred to a vehicle in the vehicles using a current spacing between the vehicles; and determining, by the computer system, the desired spacing that avoids the potential energy of the object being transformed into a kinetic energy that is transferred to the vehicle.

3. The computer implemented method of claim 1, wherein repositioning, by the computer system, the vehicles to obtain the desired spacing between the vehicles comprises:

adjusting, by the computer system, a speed of the vehicles to obtain the desired spacing between the vehicles.

4. The computer implemented method of claim 1, wherein repositioning, by the computer system, the vehicles to obtain the desired spacing between the vehicles comprises:

changing, by the computer system, a lane for the vehicles to obtain the desired spacing between the vehicles.

5. The computer implemented method of claim 1, wherein repositioning, by the computer system, the vehicles to obtain the desired spacing between the vehicles comprises:

displaying, by the computer system, an instruction for a speed change of the vehicles, wherein the speed change results in the desired spacing for the vehicles.

6. The computer implemented method of claim 1, wherein the simulation system is a digital twin system.

7. A computer system comprising:

a number of processor units, wherein the number of processor units executes program instructions to:

simulate multiple independent vehicles moving on a road using a simulation system;

determine an energy of the vehicles moving on the road using the simulation system, wherein the energy comprises kinetic energy and potential energy;

determine a desired spacing for the vehicles needed to reduce an undesired vehicle contact in response to an unexpected change in driving parameters for a number of the vehicles based on the energy of the vehicles moving on the road using the simulation system; and perform a set of actions that cause physical repositioning of the vehicles on the road using on the desired spacing determined for the vehicles, wherein in determining the desired spacing between the vehicles needed to reduce the undesired vehicle contact in response to the unexpected change in the driving parameters for the number of the vehicles based on the energy of the vehicles using the simulation system, the number of processor units executes the program instructions to:

determine a potential release of the energy for a potential driving scenario with the unexpected change in the driving parameters that results in a transfer of the kinetic energy between the vehicles using a current spacing between the vehicles; and determine the desired spacing that avoids the transfer of the kinetic energy between the vehicles.

8. The computer system of claim 7, wherein in determining the desired spacing between the vehicles needed to reduce the undesired vehicle contact in response to the unexpected change in the driving parameters for the number of the vehicles based on the energy of the vehicles using the simulation system, the number of processor units executes the program instructions to:

determine a potential release of the energy for a potential driving scenario with the unexpected change in the driving parameters that results in the potential energy of an object being transformed into the kinetic energy that is transferred to a vehicle in the vehicles using a current spacing between the vehicles; and determine the desired spacing that avoids the potential energy of the object being transformed into the kinetic energy that is transferred to the vehicle.

9. The computer system of claim 7, wherein in repositioning the group of the vehicles to obtain the desired spacing between the vehicles, the number of processor units executes the program instructions to:

adjust a speed of the group of the vehicles to obtain the desired spacing between the vehicles.

10. The computer system of claim 7, wherein in repositioning the group of the vehicles to obtain the desired spacing between the vehicles, the number of processor units executes the program instructions to:

change a lane for the group of the vehicles to obtain the desired spacing between the vehicles.

11. The computer system of claim 7, wherein in repositioning the vehicles to obtain the desired spacing between the vehicles, the number of processor units executes the program instructions to:

display an instruction for a speed change of the vehicles, wherein the speed change results in the desired spacing for the vehicles.

12. The computer system of claim 7, wherein the simulation system is a digital twin system.

13. A computer program product for spacing multiple independent vehicles, the computer program product comprising a non-transitory computer readable storage medium having program instructions embodied therewith, the program instructions executable by a computer system to cause the computer system to perform a method of:

simulating, by the computer system, the vehicles moving on a road using a simulation system;

determining, by the computer system, an energy of the vehicles moving on the road using the simulation system, wherein the energy comprises kinetic energy and potential energy;

determining, by the computer system, a desired spacing for the vehicles needed to reduce an undesired vehicle contact in response to an unexpected change in driving parameters for a number of the vehicles based on the energy of the vehicles moving on the road using the simulation system; and performing, by the computer system, a set of actions for that cause physical repositioning of the vehicles on the road using on the desired spacing determined for the vehicles, wherein in determining the desired spacing between the vehicles needed to reduce the undesired vehicle contact in response to the unexpected change in the driving parameters for the number of the vehicles based on the energy of the vehicles using the simulation system, the number of processor units executes the program instructions to:

determine a potential release of the energy for a potential driving scenario with the unexpected change in the driving parameters that results in a transfer of the kinetic energy between the vehicles using a current spacing between the vehicles; and determine the desired spacing that avoids the transfer of the kinetic energy between the vehicles.

14. The computer program product of claim 13, wherein the program instructions executable by the computer system cause the computer system to display an instruction for a speed change of the vehicles, wherein the speed change results in the desired spacing for the vehicles.

15. The computer program product of claim 13, wherein the program instructions executable by the computer system cause the computer system to change a lane for the vehicles to obtain the desired spacing between the vehicles.

16. The computer program product of claim 13, wherein the simulation system is a digital twin system.

\* \* \* \* \*